(12) United States Patent
Grant et al.

(10) Patent No.: US 10,618,831 B2
(45) Date of Patent: Apr. 14, 2020

(54) PARISON PLUNGER ACTUATION

(71) Applicant: Owens-Brockway Glass Container Inc., Perrysburg, OH (US)

(72) Inventors: Edward A. Grant, Toledo, OH (US); Ronald Rook, Bloomdale, OH (US); Thomas R. Kirkman, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 262 days.

(21) Appl. No.: 15/867,261

(22) Filed: Jan. 10, 2018

(65) Prior Publication Data
US 2019/0210907 A1 Jul. 11, 2019

(51) Int. Cl.
*C03B 11/16* (2006.01)
*C03B 11/10* (2006.01)
*C03B 9/325* (2006.01)
*C03B 9/193* (2006.01)

(52) U.S. Cl.
CPC ............ *C03B 11/16* (2013.01); *C03B 9/1934* (2013.01); *C03B 9/1936* (2013.01); *C03B 9/325* (2013.01); *C03B 11/10* (2013.01); *C03B 2215/50* (2013.01)

(58) Field of Classification Search
CPC ... C03B 9/1934; C03B 9/1936; C03B 9/1932; C03B 9/325
See application file for complete search history.

(56) References Cited

U.S. PATENT DOCUMENTS

| 13,402 | A | * | 8/1855 | Stone | C03B 9/165 65/293 |
|---|---|---|---|---|---|
| 30,106 | A | * | 9/1860 | Focer | C03B 9/165 65/293 |
| 275,298 | A | * | 4/1883 | Wallace | C03B 19/04 65/316 |
| 480,774 | A | * | 8/1892 | Leng | C03B 23/095 65/296 |
| 509,214 | A | * | 11/1893 | Friedrich | C03B 9/165 65/293 |
| 509,525 | A | * | 11/1893 | Gray | C03B 9/165 65/293 |
| 606,200 | A | * | 6/1898 | Friedrich | C03B 23/095 65/296 |
| 767,515 | A | * | 8/1904 | Forster | C03B 9/165 65/293 |
| 1,502,560 | A | * | 7/1924 | Glaspey | C03B 9/325 65/232 |

(Continued)

FOREIGN PATENT DOCUMENTS

DE 2147349 B1 9/1972
DE 202012101935 U1 10/2012

(Continued)

OTHER PUBLICATIONS

English language machine translation of FR 2153382 to Gantenbrink.*
(Continued)

*Primary Examiner* — Jason L Lazorcik (57) ABSTRACT

An apparatus and a method of actuating a parison plunger includes transforming linear force applied to a plunger extension into roto-translational motion of the plunger extension via a cam path between the plunger extension and a piston.

24 Claims, 8 Drawing Sheets

(56) References Cited

U.S. PATENT DOCUMENTS

| | | | | |
|---|---|---|---|---|
| 1,560,158 A | * | 11/1925 | Glaspey | C03B 9/22 65/218 |
| 1,560,159 A | * | 11/1925 | Glaspey | C03B 9/325 65/232 |
| 1,695,894 A | * | 12/1928 | Glaspey | C03B 9/325 65/207 |
| 2,238,198 A | * | 4/1941 | Weber | C03B 11/02 65/248 |
| 2,843,973 A | * | 7/1958 | Clignet | B29C 43/00 65/248 |
| 3,374,079 A | | 3/1968 | Daly | |
| 3,479,173 A | | 11/1969 | Bracken | |
| 4,008,063 A | * | 2/1977 | Kramer | C03B 9/1932 65/305 |
| 4,072,491 A | * | 2/1978 | Kramer | C03B 9/1932 65/72 |
| 4,273,567 A | | 6/1981 | Scholl et al. | |
| 4,657,474 A | | 4/1987 | Nebelung | |
| 5,266,095 A | | 11/1993 | Futterknecht et al. | |
| 5,411,564 A | | 5/1995 | Bolin | |
| 5,707,414 A | | 1/1998 | Leidy | |
| 6,286,339 B1 | | 9/2001 | DiFrank | |
| 6,497,120 B1 | | 12/2002 | Kozora | |
| 6,907,754 B2 | | 6/2005 | Kozora | |
| 9,156,719 B2 | | 10/2015 | Perrone et al. | |
| 9,212,078 B2 | | 12/2015 | Bratton et al. | |
| 9,440,761 B2 | | 9/2016 | Villaret De Chauvigny et al. | |
| 9,488,257 B2 | * | 11/2016 | Kato | F16H 25/2261 |
| 2004/0079116 A1 | | 4/2004 | Kozora | |
| 2010/0264107 A1 | * | 10/2010 | Lonsway | B29C 49/02 215/40 |
| 2013/0270211 A1 | * | 10/2013 | Perrone | B65D 39/08 215/44 |
| 2013/0299444 A1 | | 11/2013 | Villaret De Chauvigny et al. | |
| 2014/0042672 A1 | | 2/2014 | Lonsway et al. | |
| 2016/0122223 A1 | * | 5/2016 | Lequien | C03B 9/1932 53/452 |

FOREIGN PATENT DOCUMENTS

| | | | | |
|---|---|---|---|---|
| FR | 2153382 A1 | * | 5/1973 | C03B 9/1936 |
| JP | 62003028 | | 1/1987 | |
| WO | 0240194 A1 | | 5/2002 | |

OTHER PUBLICATIONS

PCT International Search Report and Written Opinion, Int. Serial No. PCT/US2018/066770, Int. Filing Date: Dec. 20, 2018, Applicant: Owens-Brockway Glass Container Inc., dated Mar. 14, 2019.

* cited by examiner

PARISON PLUNGER ACTUATION

This patent application discloses innovations to container manufacturing and, more particularly, to parison plunger actuators and methods for producing parisons of containers with internally threaded necks.

BACKGROUND

Containers may be produced by various processes including, plastic injection molding and/or blow molding techniques, metal stamping and drawing practices, and glass blank and blow molding processes. In the latter example, molten glass from a furnace is typically formed into glass containers in an efficient, large scale, commercial manufacturing process using an Individual Section ("I.S.") machine. The molten glass is cut into uniform segments of glass called "gobs," which are guided into blank molds. In each blank mold, a hot parison is formed, either by using a long plunger to push the glass into the blank mold, or by using a short, plunger and blowing the glass into conformity with the blank mold using gas passed through or around the plunger. The hot parison is then inverted and transferred to a blow mold, where the hot parison is blown into conformity with the blow mold in the shape of the container, and then is cooled to the point where it is sufficiently rigid to be gripped and removed from the blow mold. In general, a U.S. patent that illustrates an example of a process and equipment of this type includes U.S. Pat. No. 6,286,339.

More specifically, U.S. Pat. No. 9,440,761 discloses an example of a process and equipment for producing an internally threaded neck in a parison of a container. The equipment includes a plunger having a helical groove or rib on its outside surface, and a helical guide between the plunger and a thimble to transform linear movement by a linear actuator into roto-translational motion of the plunger. Although the process and equipment described in the '761 patent are commercially successful, the present disclosure provides further improvements.

BRIEF SUMMARY OF THE DISCLOSURE

The present disclosure embodies a number of aspects that can be implemented separately from or in combination with each other.

In accordance with an aspect of the disclosure, there is provided a parison plunger actuator to actuate a parison plunger in forming a parison of a container. The actuator includes a plunger cartridge that includes a plunger extension sub-assembly that has a plunger extension that carries cam follower mounts, and earn followers carried by the cam follower mounts of the plunger extension.

In accordance with another aspect of the disclosure, there is provided a parison plunger actuator for forming a parison of a container. The actuator includes a plunger cylinder assembly that includes a cylinder housing, an actuator piston reciprocably carried in the cylinder housing, and a piston rod coupled to the piston. The actuator also includes a plunger cartridge carried by the plunger cylinder assembly. The plunger cartridge includes a plunger extension sub-assembly that has a plunger extension carrying cam follower mounts, and at least two sets of cam followers carried by the cam follower mounts of the plunger extension, wherein the sets of cam followers include cam followers that are axially spaced apart and circumferentially spaced apart. The plunger extension sub-assembly also has a plunger extension center support disposed radially inward with respect to the plunger extension and coupled to the piston rod of the plunger cylinder assembly. The plunger cartridge also includes a piston disposed radially outward with respect to the plunger extension and including a wall having a cam path to receive and guide the cam followers, and a thimble lock carried radially outwardly of the plunger extension. The plunger cartridge further includes a plunger pull spring disposed radially outward with respect to the thimble lock and axially between corresponding portions of the thimble lock and the plunger extension, and a load position spring disposed radially outward with respect to the piston and axially against a portion of the piston.

In accordance with a further aspect of the disclosure, there is provided a method of operating a parison plunger actuator. The method comprises the steps of:

a) advancing a plunger extension along a longitudinal axis through a piston; and b) retracting the plunger extension by a roto-translational motion, wherein said plunger extension is rotated around the longitudinal axis while being longitudinally retracted, wherein the roto-translational motion for the retraction of the plunger is generated by:

imposing a linear force on the plunger extension, and transforming said linear force on said plunger extension into said roto-translational motion of said plunger extension via a helical path between said plunger extension and said piston.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

In general, and in accordance with one aspect of the present disclosure, container manufacturing equipment and processes are disclosed for producing container parisons having internally threaded necks. In particular, a plunger extension is retracted by transforming linear force applied to the plunger extension into roto-translational motion of the plunger extension via a cam path car helical guide between the plunger extension and a piston around the plunger extension. Additionally, the helical guide or cam path may carry cam followers for smooth motion, minimized backlash, and longer life, and for forming of more accurate internal thread. Moreover, at least a portion of the presently disclosed apparatus may be embodied in a quick-change cartridge configuration that may be easily swapped in and out of existing plunger actuators.

In one presently disclosed embodiment, the apparatus is described with respect a manufacturing process for producing a container composed of glass. But those of ordinary skill in the art will recognize that the present disclosure may be used to produce containers composed of other materials suitable for producing containers.

Figure 1:
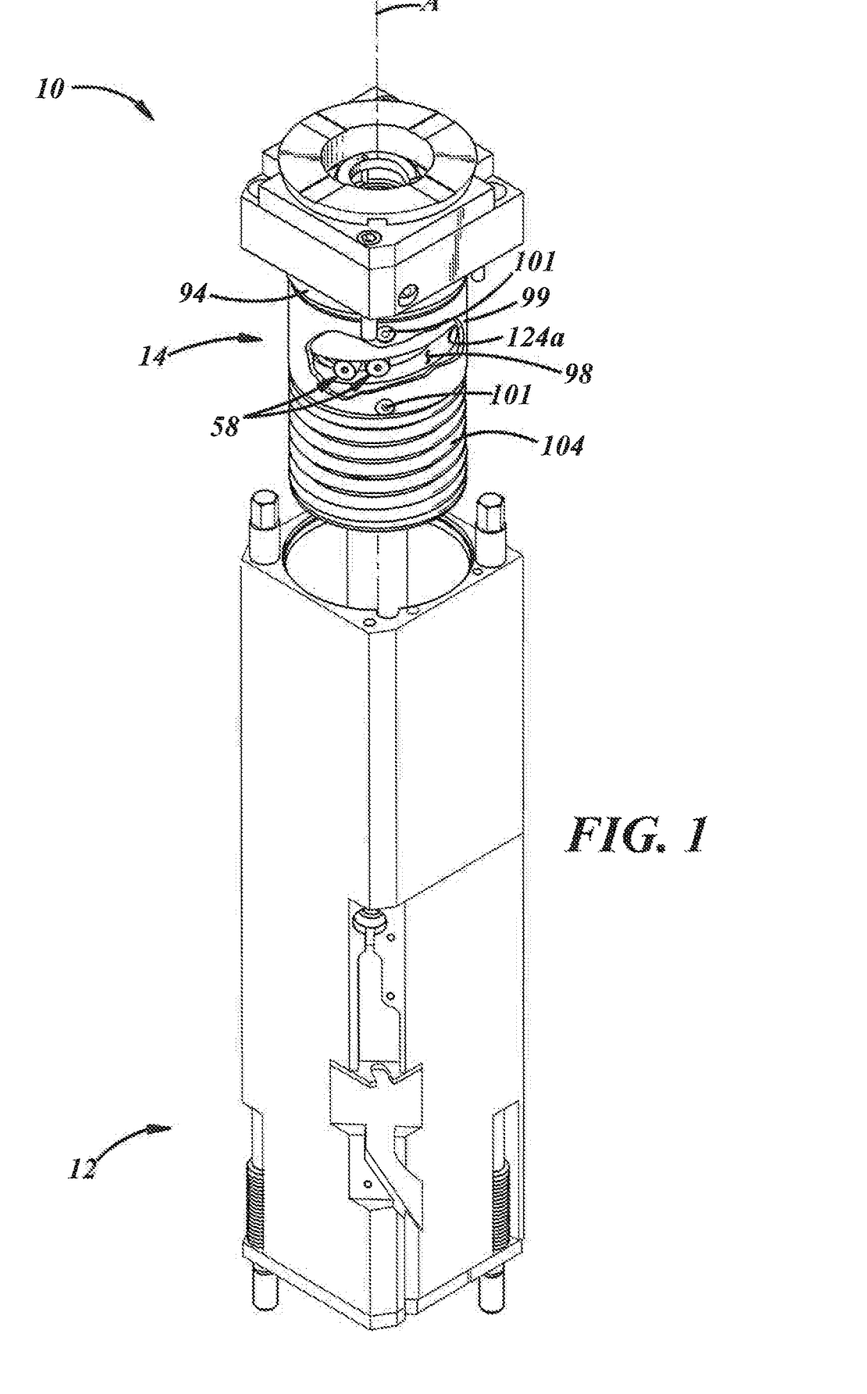
FIG. 1 is an exploded perspective view of a plunger actuator for actuating a plunger (not shown) used in forming a preform or parison of a container (not shown), in accordance with an illustrative embodiment of the present disclosure, and illustrating a plunger cartridge in a plunger up mode.

Now, with reference to the drawing figures, FIG. 1 illustrates a parison plunger actuator 10 for actuating a plunger (not shown) used in forming parisons of containers having internally threaded necks (not shown). The actuator 10 generally includes a driver 12 that produces linear motion along a longitudinal axis A. The actuator 10 also generally includes a plunger actuation assembly or cartridge 14 that is coupled to the driver 12 to convert the linear motion produced by the driver 12 into roto-translational motion.

Figures 1A, 2:
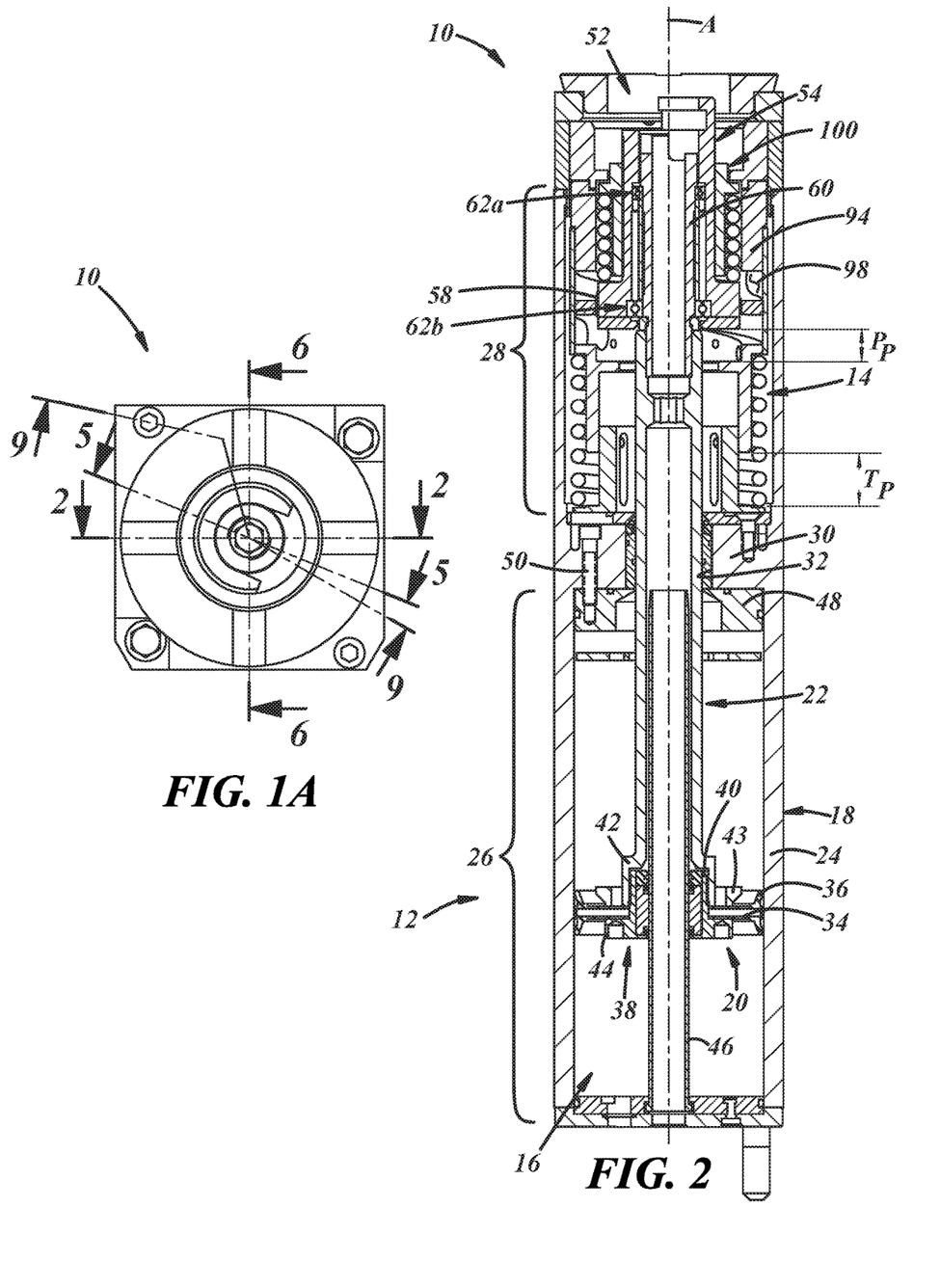
FIG. 1A is a top view of the plunger actuator of FIG. 1.
FIG. 2 is a fragmentary cross-sectional view of the plunger actuator of FIG. 1, taken along line 2-2 of FIG. 1A.

With reference to FIG. 2, those of ordinary skill in the art will recognize that the driver 12 may include a plunger cylinder assembly 16, or a ball-screw driver, or an electro-magnetic driver, or any other suitable type of driver to produce linear motion. The illustrated plunger cylinder assembly 16 may be pneumatically powered by pressurized gas, or hydraulically powered by pressurized oil. The illustrated plunger cylinder assembly 16 generally includes a cylinder housing 18, a piston 20 reciprocably carried in the cylinder housing 18, and a piston rod 22 coupled to the piston 20.

The cylinder housing 18 may include an outer wall 24 extending circumferentially about the axis A and including a cylinder assembly portion 26 and a plunger cartridge portion 28, and an intermediate support wall 30 extending radially inwardly from the outer wall 24 and axially between the other portions 26, 28.

The piston rod 22 may extend through a passage 32 of the support wall 30, from a cylinder assembly side of the support wall 30 to a plunger cartridge side of the support wall 30. The piston rod 22 may include a hollow shaft that may serve as a conduit, as will be discussed below.

The piston 20 may include a base wall 34 that may extend transversely with respect to the axis A, and an outer wall 36 extending axially away from the base wall 34 for sealing contact with an interior surface of the cylinder housing outer wall 24. The piston 20 may be indirectly fastened to the piston rod 22, as in the illustrated embodiment, or may be directly or integrally fastened thereto, or welded, riveted, or staked thereto, or coupled thereto in any other suitable manner. In the illustrated embodiment, a nut 38 has an externally threaded body 40 threaded to an internally threaded enlarged head 42 of the piston rod 22, and also has a flanged portion 44 extending radially outwardly from the threaded body 40 to trap a central portion of the piston 20 to a flanged portion 43 of the enlarged head 42 of the piston rod 22.

The plunger cylinder assembly 16 also may include a blow tube 46 extending through the piston 20 and the head 42 of the piston rod 22 and into a further portion of the piston rod 22. The blow tube 46 may be stationary and the piston rod 22 may move linearly relative to the blow tube 46. Accordingly, as illustrated, a bushing and various seals and the like may be carried between the blow tube 46 and the piston 20. More specifically, the bushing may be carried within the nut 38 and axially trapped by a corresponding shoulder of the nut 38. As illustrated, the plunger cylinder assembly 16 also may include various blow tube support and guide bushings, seals, wipers, and other like components.

Likewise, as illustrated, the plunger cylinder assembly 16 also may include various piston rod support and guide bushings, seals, wipers, and other like components. For example, a seal puck 48 may be carried in the plunger cylinder housing 18 and coupled to the support wall 30 by one or more fasteners 50 for sealing the cylinder assembly portion of the housing 18.

With reference to FIG. 2, the plunger cartridge 14 is carried in the plunger cartridge portion of the cylinder housing 18 and includes a plunger extension sub-assembly 52, which may be self-contained, in addition to various other components that will be described further herein below. But first, and with reference also to FIGS. 3 and 4, the plunger extension sub-assembly 52 includes a plunger extension 54 having an exterior and carrying one or more cam follower mounts 56 (FIGS. 3 and 4) to accept one or more cam followers 58 (FIG. 1) carried by the cam follower mount(s) 56. The sub-assembly 52 further may include a plunger extension center support (or plunger screw) 60 disposed radially inwardly with respect to the plunger extension 54, and at least one bearing carried around the center support 60, for instance, upper and lower bearings 62a,b.

Figure 3:
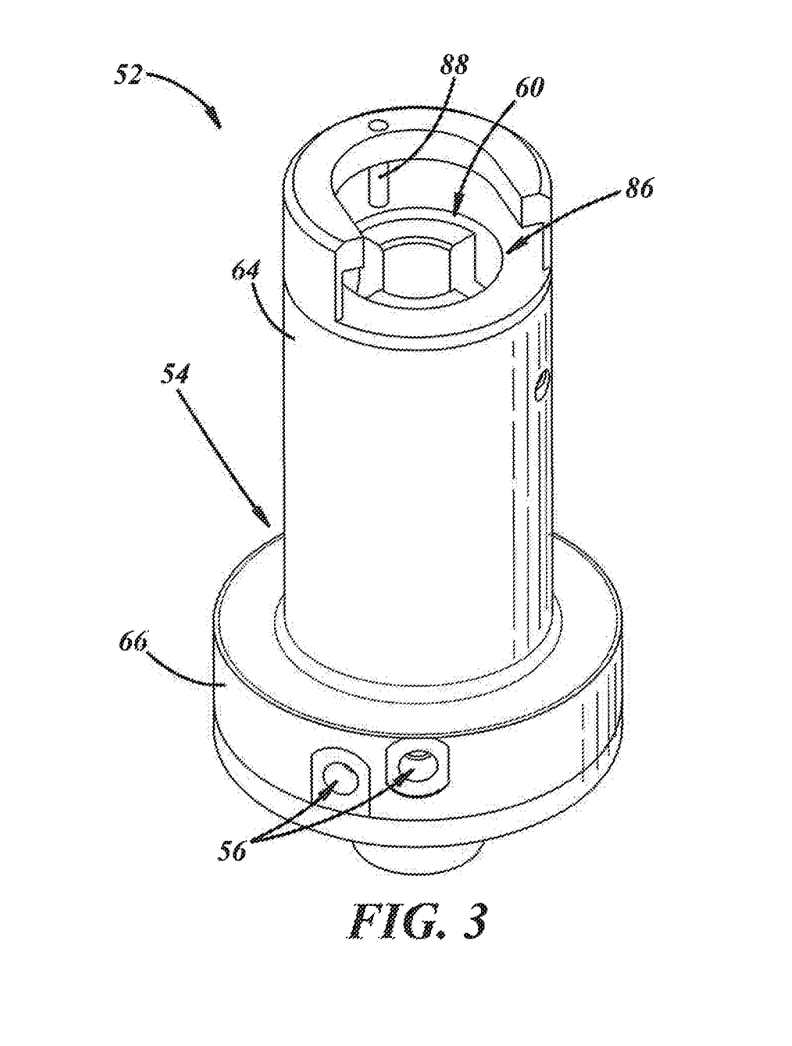
FIG. 3 is an upper perspective view of a plunger extension sub-assembly of the plunger cartridge of FIG. 1.
Figure 4:
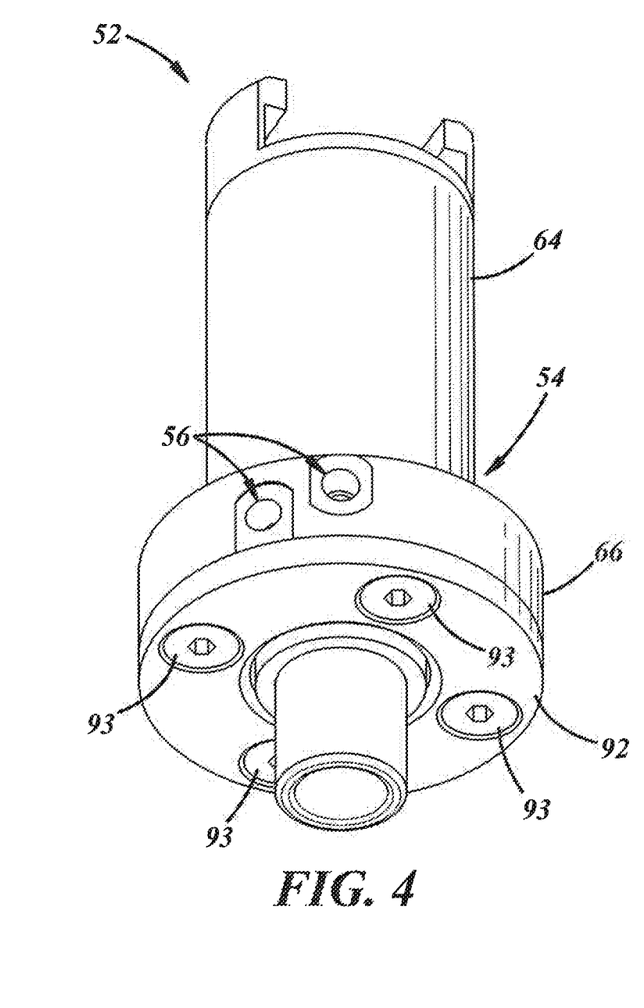
FIG. 4 is a lower perspective view of the plunger extension sub-assembly of the plunger cartridge of FIG. 1.
Figure 5:
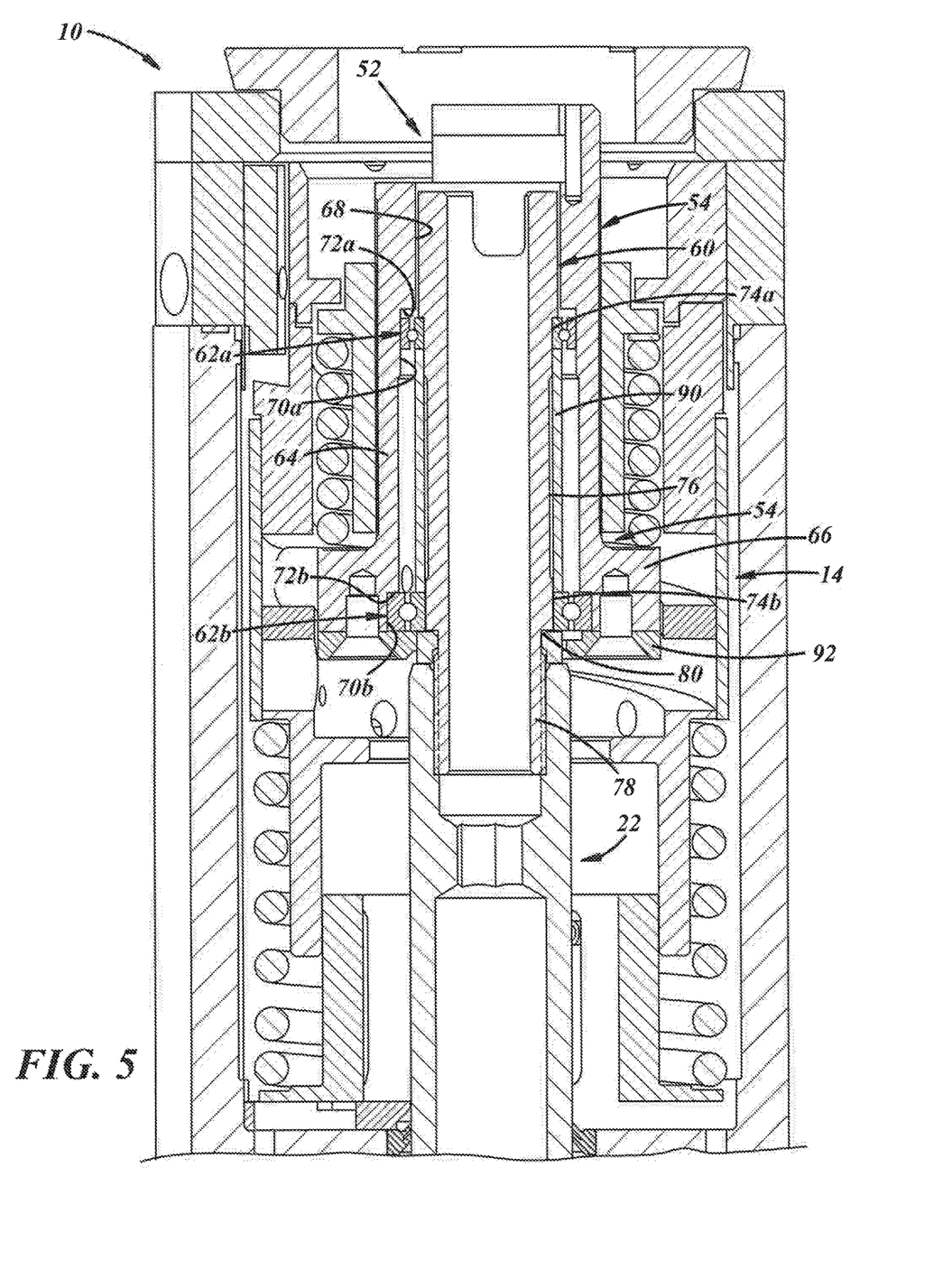
FIG. 5 is an enlarged, fragmentary, cross-sectional view of the plunger actuator of FIG. 1, taken along line 5-5 of FIG. 1A.

With reference to FIG. 5, the plunger extension 54 may include a body 64 that may be cylindrical and a shoulder 66 that may be cylindrical and extending radially outwardly from the body 64. Also, the plunger extension 54 may include an interior and a minor diameter bore 68 and upper and lower counterbores 70a, 70b that may carry the bearings 62a,b and that may establish axially oppositely facing upper and lower shoulders 72a, 72b. With reference to FIGS. 3 and 4, the cam follower mounts 56 may include internally threaded bores in the shoulder 66 as illustrated, and/or radially outwardly extending studs, and/or any other features suitable for coupling to the cam followers 58 (FIG. 1).

With reference to FIG. 1, the cam followers 58 may include two or more sets of cam followers 58 (one set shown). The sets of cam followers 58 may be circumferentially spaced apart from one another, for instance, diametrically opposed, and each set of cam followers 58 may include upper and lower cam followers 58 that are axially spaced apart from one another. The cam followers 58 may include rolling elements like cylindrical rollers, as illustrated, or semi-spherical bearings, or fixed low friction elements like NYLON studs, or any other suitable cam following elements.

With reference to FIG. 5, the plunger extension center support 60 may include upper and lower bearing lands 74a,b for cooperating with corresponding inner portions of the upper and lower bearings 62a,b, and a reduced diameter portion 76 between the bearing lands 74a,b. Also, at a lower end, the plunger extension center support 60 may include a piston rod coupling end 78, which may have threads for threaded engagement with corresponding threads of a threaded end of the piston rod 22. The center support 60 also may include an axially facing shoulder 80 between the piston rod coupling end 78 and the lower bearing land 74b.

The center support 60 may comprise a hollow shaft that may serve as a conduit, as will be discussed below.

Figure 6:
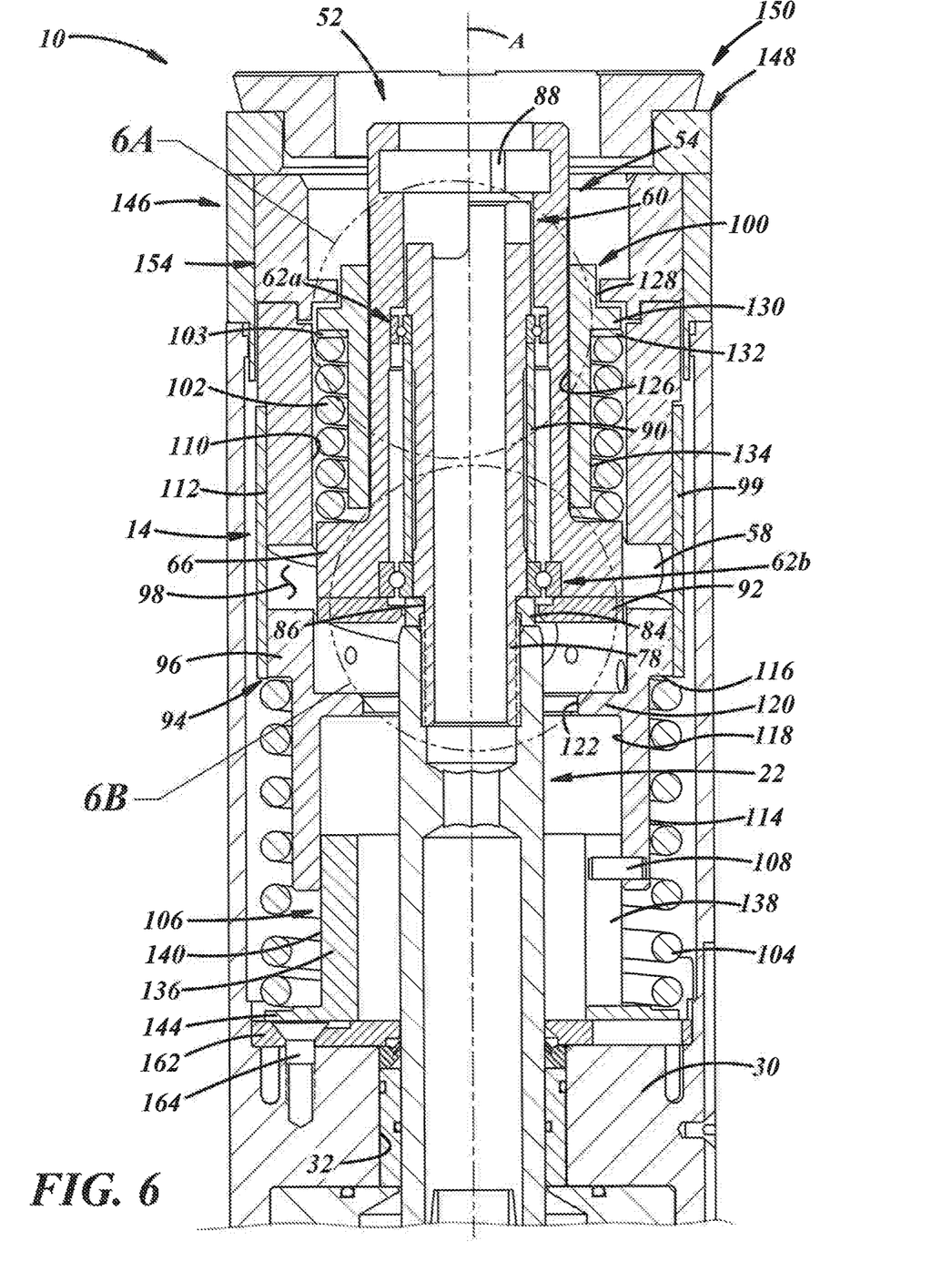
FIG. 6 is an enlarged, fragmentary, cross-sectional view of the plunger actuator of FIG. 1, taken along line 6-6 of FIG. 1A.
Figure 6A:
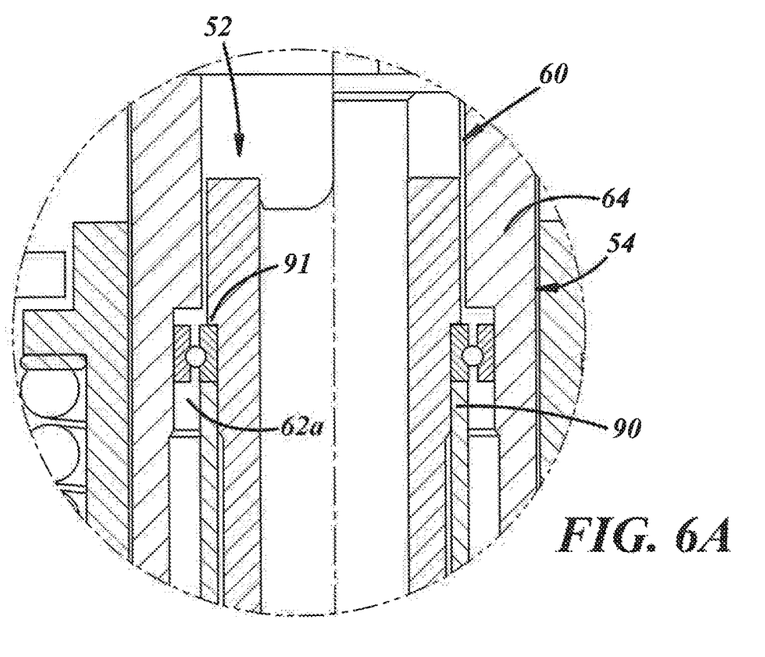
FIG. 6A is a further enlarged cross-sectional view of the plunger actuator of FIG. 1, taken from circle 6A of FIG. 6.
Figure 6B:
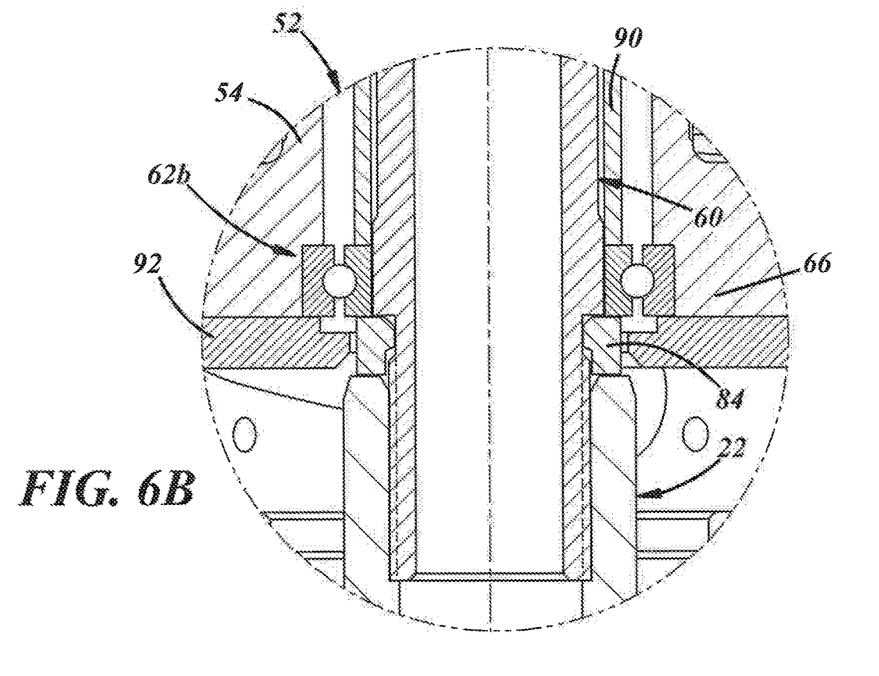
FIG. 6B is a further enlarged cross-sectional view of the plunger actuator of FIG. 1, taken from circle 6B of FIG. 6.

With reference to FIGS. 6 and 6B, at a lower end, the plunger extension sub-assembly 52 may include a wear washer 84 carried at a lower end of the plunger extension center support 60. The wear washer 84 may help hold the sub-assembly 52 together so that the sub-assembly 52 can be easily assembled to the rest of the plunger cartridge 14 (FIG. 6). Also, the wear washer 84 may compress the lower bearing 62b to protect the plunger shaft 22 and provide a flat surface against the bearing 62b.

With reference to FIGS. 6, 6A, and 6B, the bearings 62a,b may include ball or roller bearings, bushings, or the like. A bearing spacer sleeve 90 may be carried around the plunger extension center support 60 to axially space the bearings 62a,b apart from one another. The upper bearing 62a may include a Conrad type of bearing for rotational loads. As particularly shown in FIG. 6A, an inner race of the upper bearing 62a may be pinched between the bearing spacer sleeve 90 and a shoulder 91 of the plunger extension center support 60. Also, as particularly shown in FIG. 6B, a bearing plate 92 may be coupled to a lower end of the plunger extension 54 to retain the lower bearing 62b. The lower bearing 62b may include a crossed roller bearing to provide good rotational load capacity, and good thrust load and shock load capacities. An inner race of the lower bearing 62b may be pinched between the bearing spacer sleeve 90 and the wear washer 84. An outer race of the lower bearing 62b may be pinched between the shoulder 66 of the plunger extension 54 and the bearing plate 92.

With reference to FIG. 6, an upper end of the plunger extension 54 may be coupled to a plunger (not shown), for example, via a coupler 88 that may extend (e.g., axially) through respective portions of the plunger extension 54 and the plunger to lock the plunger to rotate with the plunger extension 54. The coupler 88 may include a dowel pin, roll pin, or any other suitable pin, or a screw, or any other suitable component(s) to rotationally fix the plunger and the plunger extension 54. The coupler 88 may extend through an axially-extending external groove of the plunger (not shown).

The plunger cartridge 14 also includes various other components, in addition to the plunger extension sub-assembly 52. For instance, the cartridge 14 includes a piston 94 disposed radially outwardly with respect to the plunger extension 54 and including a wall 96 having a cam path 98 to receive and guide the cam followers 58. The cartridge 14 also may include a piston sleeve 99 carried on the piston 94 and coupled thereto, for instance, using fasteners 101 (FIG. 1), for example, flat head fasteners or any other suitable fasteners. The cartridge 14 also may include a thimble lock 100 carried radially outwardly of the plunger extension 54. Also, the plunger cartridge 14 includes a thimble lock spring or plunger pull spring 102 disposed radially outwardly with respect to the thimble lock 100 and axially between corresponding portions of the thimble lock 100 and the plunger extension 54. Additionally, the plunger cartridge 14 includes a load position spring 104 disposed radially outwardly with respect to the piston 94 and axially against a portion of the piston 94. Further, the plunger cartridge 14 includes a spring retainer 106 to retain the spring 104, and one or more keys 108 carried by the piston 94 and cooperating with the spring retainer 106 to retain the piston 94 and the retainer 106 together for assembly.

The piston 94 may include an upper end having a first inner diameter 110 circumscribing at least a portion of the plunger extension sub-assembly 52, and carrying the cam path 98, and also having a first outer diameter 112 that may carry the sleeve 99. The piston 94 also may include a lower end having a second outer diameter 114 smaller than the first outer diameter 112 and establishing a shoulder 116 that may face axially, a second inner diameter 118, and a transversely extending wall 120 with a passage 122 therethrough to accommodate the piston rod 22.

Figure 7:
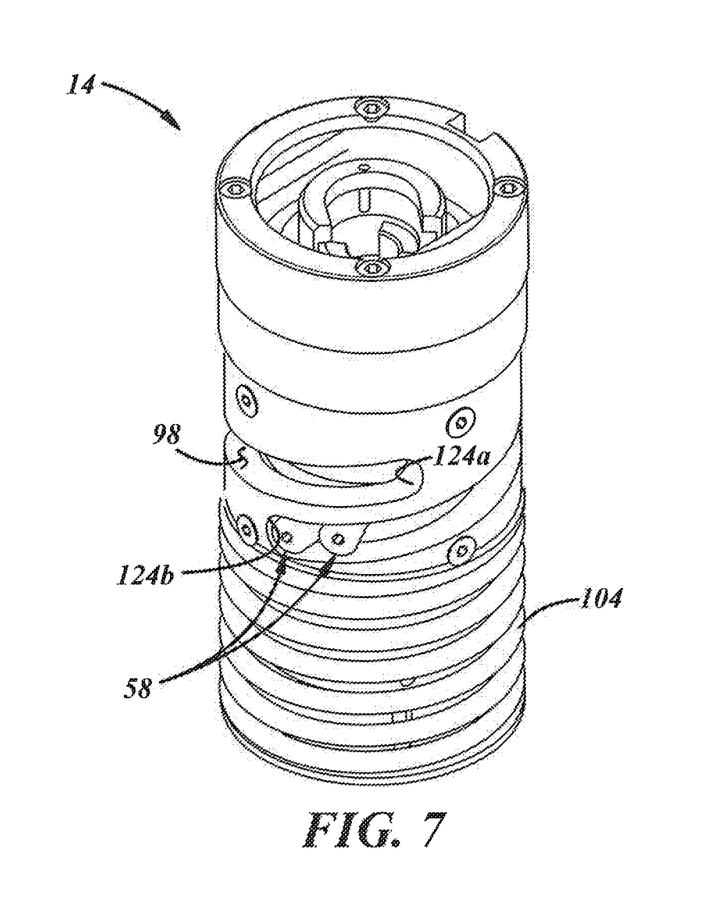
FIG. 7 is a perspective view of the plunger cartridge of FIG. 1 illustrated in a plunger mill mode.
Figure 8:
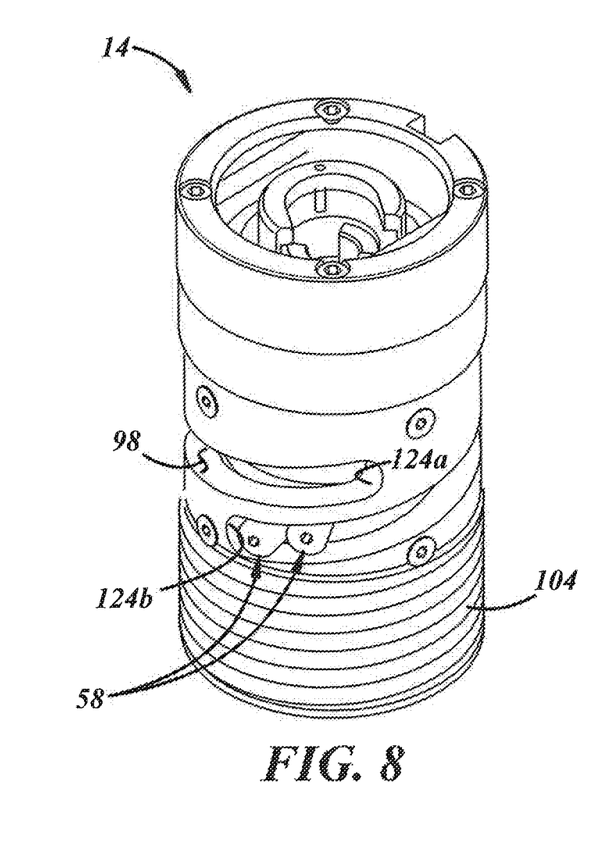
FIG. 8 is a perspective view of the plunger cartridge of FIG. 1 illustrated in a thimble pull mode.

With reference to FIGS. 7 and 8, the cam path 98 may be hardened by induction hardening, flame hardening, or in any other suitable manner, and may include an upper end 124a and a lower end 124b that may circumferentially overlap one another such that the cam path 98 may extend circumferentially for greater than 360 degrees. The cam path 98 may be helical and may be a through slot, a depression, a space between shoulders, or of any other suitable configuration.

With reference to FIG. 6, the thimble lock 100 may include an inner diameter 126 circumscribing a corresponding portion of the plunger extension 54. The thimble lock 100 also may include an upper portion having a first outer diameter 128 and a radially outwardly extending flange 130 establishing a shoulder 132, and a lower portion having a second outer diameter 134 that may be smaller than the first outer diameter 128.

The plunger pull spring 102 may be located axially between the thimble lock shoulder 132 and the plunger extension shoulder 66 to bias the thimble lock 100 axially away from the plunger extension 54.

The spring retainer 106 includes a pilot portion 136 that is disposed radially inward of a corresponding portion of the piston 94 and includes one or more channels 138 that may extend predominantly axially to define a stroke limit of the piston 94. The pilot portion 136 may be cylindrical with an outer diameter 140 corresponding to the inner diameter 118 of the lower portion of the piston 94, and a base flange 144 extending radially outwardly from the cylindrical portion 140 for locating against (or relatively proximate) the intermediate support wall 30 of the cylinder housing 18.

The key 108 extends radially inwardly from the lower portion of the piston 94 and at least partially into the channel 138 of the spring retainer 106 to maintain the load position spring 104 assembled to the plunger cartridge 14 so that the cartridge 14 can be easily installed and removed from the rest of the actuator 10. The key 108 may include a dowel pin, roll pin, or any other component or feature suitable for use as an axial stop.

The load position spring 104 may be located axially between the piston shoulder 116 and the cylinder housing intermediate support wall 30. More specifically, the load position spring 104 may include a lower end located against the base flange 144 of the piston spring retainer 106. The load position spring 104 may maintain the plunger cartridge 14 in the up position when the plunger pull spring 102 pulls the plunger from the neck ring (not shown).

Additionally, the actuator 10 may include still other components. For instance, with reference to FIGS. 6 and 9, the cartridge 14 may include a cylinder mounting collar 146, a wear plate 148, an adaptor ring 150 carried by the wear plate 148, and respective fasteners (not all shown) to mount the cartridge 14 to the cylinder housing 18. Similarly, the cartridge 14 may include a piston cap 154 that may be fastened to the top of the piston 94 by one or more fasteners 156 (FIG. 9).

Figure 9:
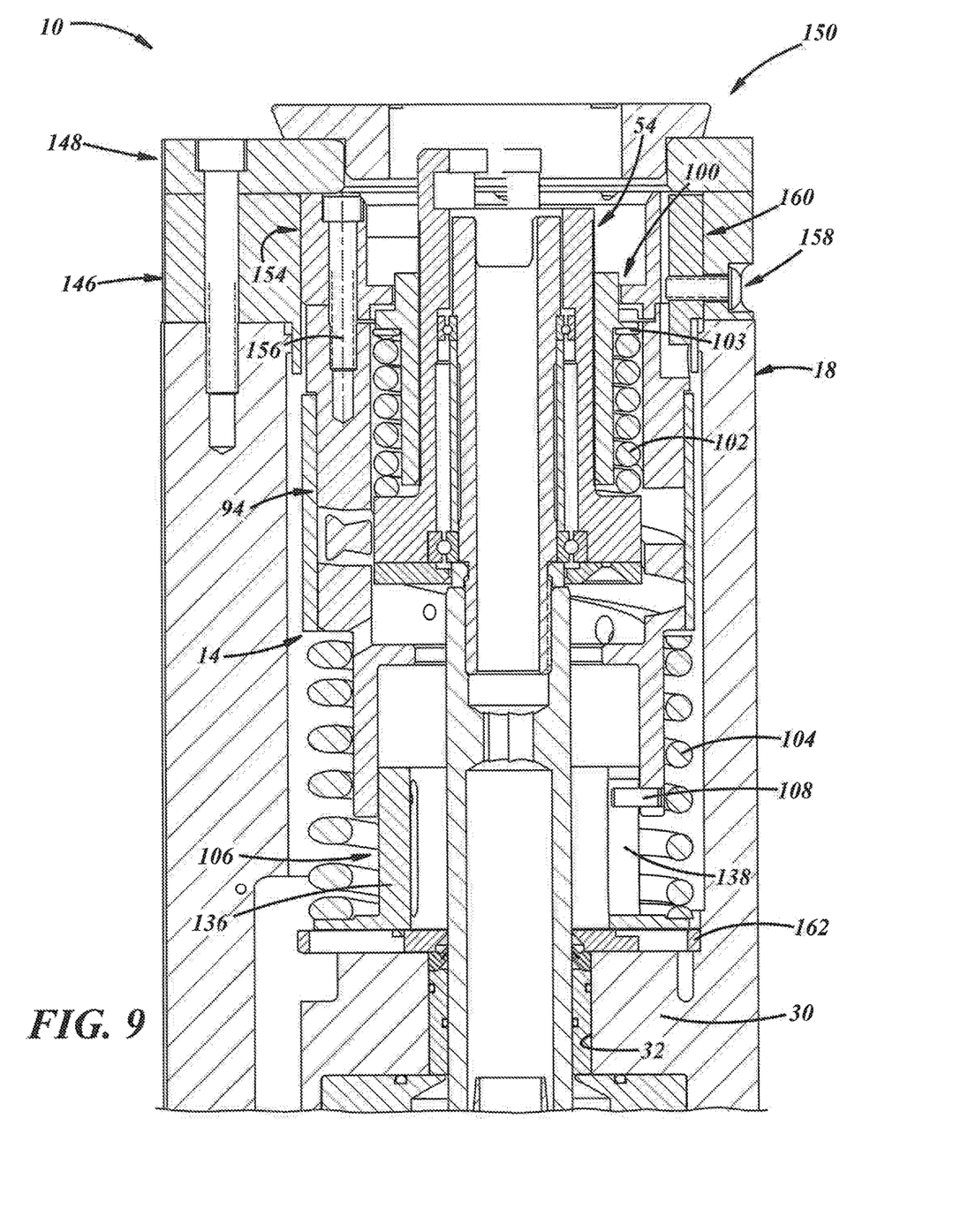
FIG. 9 is an enlarged, fragmentary, cross-sectional view of another portion of the plunger actuator of FIG. 1, taken along line 9-9 of FIG. 1A.

Also, as shown in FIG. 9, an anti-rotation key 160 may be coupled to the piston cap 154 with a fastener 158, e.g., a button head screw. Accordingly, the piston 94 may be non-rotatably carried by the mounting collar 146 and the cylinder housing 18. Furthermore, the actuator 10 also may include a seal retainer plate 162 between the cartridge 14 and the intermediate support wall 30 of the cylinder housing 18. The plate 162 may be fastened to the intermediate support wall 30 by one or more fasteners 164 (FIG. 6) and is arranged with respect to the passage 32 in the intermediate support wall 30 to retain the various piston rod seals, bushings, and the like carried in the passage 32.

In assembly, and with reference to FIGS. 6, 6A, and 6B, the upper bearing 62a is assembled into the plunger extension 54. Then, the bearing spacer sleeve 90 is installed into the plunger extension 54, wherein a radially outer chamfer of the sleeve 90 is oriented upwardly against the inner race of the upper bearing 62a. Next, the lower bearing 62b is installed in the plunger extension 54, and the bearing plate 92 is coupled to the bottom or lower end of the plunger extension 54, for instance, using flat head screws 93 (FIG. 4) that may be coated with LOCTITE and torqued to, for example, 140 in-lbs.

Thereafter, the coupler 88 is installed into the upper portion of the plunger extension 54. Next, the plunger extension center support 60 is installed through the top of the plunger extension 54, through the upper bearing 62a, bearing spacer 90, and lower bearing 62b. After that, the wear washer 84 is installed over the threaded portion 78 of the plunger extension center support 60 into abutment with the inner race of the lower bearing 62b. The wear washer 84 may be internally threaded for threaded receipt over the threaded portion 78 of the support 60 and may come to rest and float in a thread relief 86 between the threaded portion 78 and an adjacent shoulder of the support 60.

Then, the plunger extension sub-assembly 52 is installed into the piston 94. Next, the cam followers 58 are installed through the cam path 98 in the piston 94 and into the plunger extension cam follower mounts 56 (FIG. 4). Red LOCTITE 272 may be applied to stud threads of the cam followers 58 and the cam followers 58 may be torqued to, for example, 20 in-lbs. The cam path 98 has upper and lower, generally parallel, opposed surfaces, wherein one of the cam followers 58 preferably engages only the upper surface and is spaced apart from the lower surface and the other one of the cam followers engages only the lower surface and is spaced apart from the upper surface.

Thereafter, and with reference to FIG. 1, the piston sleeve 99 is installed to the piston 94 such that fastener holes in the sleeve 99 may be aligned with corresponding countersunk fastener holes in the piston 94, and flat head screws 101 are installed in top and bottom rows of the corresponding holes and then tightened in a cross pattern. Although not all shown, the corresponding holes and fasteners may include top and bottom rows of four equidistantly circumferentially spaced holes and fasteners.

After that, each of the flat head screws 101 is removed one at a time and the corresponding sleeve hole is countersunk, Blue LOCTITE 246 is applied to the removed screw and the screw is re-installed and tightened. The sleeve 99 and the piston 94 may be match marked so that the sleeve 99 and the piston 94 are always assembled in the same position.

Next, and with reference to FIG. 9, the plunger pull spring 102 is installed into the piston 94. Thereafter, a spring washer 103 is installed on top of the plunger pull spring 102, and the thimble lock 100 is installed between the plunger pull spring 102 and the plunger extension 54. Then, the piston cap 154 is installed onto the piston 94, aligning a keyway of the piston cap 154 with a corresponding keyway of the piston 94, and is fastened to the top of the piston 94 with the fasteners 156 that may be coated with LOCTITE 246 and torqued, for instance, to 120 in-lbs.

After that, the load position spring 104 is installed over the lower end of the piston 94, and the piston spring retainer 106 is installed into the lower end of the load position spring 104. Next, the assembly is compressed and the keys 108 are installed through the piston 94 and into the channels 138 of the piston pilot portion 136. Then, the anti-rotation key 160 is mounted to the piston cap 154, to rotationally fix the piston 94 with respect to the piston cap 154.

Subsequently, the assembled cartridge 94 with the piston cap 154 coupled thereto, may be installed into the upper end of the housing 18 and the center support 60 may be threaded to the plunger shaft 22. Finally, the cylinder mounting collar 146, the wear plate 148, and the adaptor ring 150 may be fastened to the cylinder housing 18.

In operation, and with reference to FIGS. 1-3, the parison plunger actuator 10 is illustrated in a plunger up or plunger press configuration in which an externally threaded plunger (not shown) is configured to extend into a neck ring of a blank mold (not shown) to form an internally threaded neck finish of a parison (not shown) being formed in the blank mold.

With reference to FIG. 1, the cam followers 58 are shown positioned relatively proximate the upper end 124a of the cam path 98 and the load position spring 104 is shown in an uncompressed configuration.

With reference to FIG. 2, and after the parison has been formed to include the internally threaded neck finish, the actuator 10 retracts the piston rod 22 to retract the plunger extension 54 through the thimble lock 100 to reduce or close a plunger pull gap Pp. Because the piston 94 is fixed against rotation and because the plunger extension 54 is rotatably carried in the actuator 10, retraction of the plunger extension 54 causes the cam followers 58 to follow the cam path 98 in the piston 94 and, thus, causes the plunger extension 54 to rotate about the longitudinal axis A on the bearings 62a,b. Accordingly, the externally threaded plunger (not shown) threadingly backs its way out of the internally threaded neck finish of the parison (not shown), and allows air to be provided through the blow tube 46, the piston rod 22, the plunger extension center support 60, the plunger extension 54, the plunger (not shown), and into the parison to form a bubble in the parison (not shown).

With reference to FIG. 7, the cam followers 58 are shown positioned at or relatively proximate the lower end 124b of the cam path 98, but the load position spring 104 is still shown in the uncompressed configuration.

With reference to FIG. 2, the actuator 10 further retracts the piston rod 22 to retract the plunger extension 54, the thimble lock 100, and the piston 94 to reduce or close a thimble pull gap Tp. Accordingly, the actuator 10 is cleared out of the way of the blank mold neck ring (not shown) to permit the neck ring and the formed parison carried by the neck ring to be inverted from the blank mold to a blow mold (not shown). Because the piston 94 is fixed against rotation and because the plunger extension 54 has fully rotated relative to the piston 94, the thimble pull/retraction does not result in further rotation of the plunger extension 54.

With reference to FIG. 8, the cam followers 58 are still shown positioned at or relatively proximate the lower end of the cam path 98 and the load position spring 104 is now shown in a compressed configuration.

Cooperative interaction of the cam followers 58 and the cam path 98 may be selected to trace out a helical roto-translational path of a plunger with a desired pitch. The plunger will include a parison-engaging surface carrying helical features with a pitch the same as the pitch of the helical path traced out by the cooperative interaction of the cam followers 58 and the cam path 98.

There thus has been disclosed a parison plunger actuator and method for forming an internally threaded parison, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A parison plunger actuator for actuating a parison plunger for forming a parison of a container, comprising:
   a plunger cartridge that includes:
      a plunger extension sub-assembly that has
         a plunger extension carrying cam follower mounts;
         cam followers carried by the cam follower mounts of the plunger extension;
         at least one bearing carried in an interior of the plunger extension; and
      a plunger extension center support disposed radially inward with respect to the plunger extension and the at least one bearing.

2. The apparatus of claim 1, wherein the plunger extension sub-assembly also has a bearing spacer sleeve carried around the plunger extension center support and wherein the at least one bearing includes upper and lower bearings spaced axially apart by the bearing spacer sleeve.

3. The apparatus of claim 1, wherein the plunger extension sub-assembly also has a bearing plate coupled to a lower end of the plunger extension to retain a portion of the at least one bearing.

4. The apparatus of claim 1, wherein the plunger extension sub-assembly also has a wea r washer carried at a lower end of the plunger extension center support to retain a portion of the at least one bearing.

5. The apparatus of claim 1, wherein the cam followers include axially spaced apart cam followers.

6. The apparatus of claim 1, wherein the cam followers include at least two pairs of circumferentially spaced cam followers.

7. The apparatus of claim 1, wherein the plunger cartridge also includes a piston disposed radially outward with respect to the plunger extension and including a wall having a cam path to receive and guide the cam followers.

8. The apparatus of claim 7, wherein the plunger cartridge further includes a piston sleeve carried around a portion of the piston.

9. The apparatus of claim 7, wherein the plunger cartridge also includes a load position spring disposed radially outward with respect to the piston and axially against a portion of the piston.

10. The apparatus of claim 7, further comprising a spring retainer including a pilot portion that is disposed radially inward of a corresponding portion of the piston and that includes a predominantly axially extending channel, and a key carried by the piston and extending into the channel.

11. The apparatus of claim 7, wherein the plunger cartridge also includes:
   a load position spring disposed radially outward with respect to the piston and axially against a portion of the piston;
   a thimble lock carried radially outward of the plunger extension; and
   a plunger pull spring disposed radially outward with respect to the thimble lock and axially between corresponding portions of the thimble lock and the plunger extension.

12. The apparatus of claim 1, further comprising:
   a parison forming plunger cylinder carrying the plunger cartridge, and including:
      a cylinder housing;
      a piston reciprocably carried in the cylinder housing; and
      a piston rod coupled to the piston and to the plunger extension center support.

13. A parison plunger actuator for actuating a parison plunger for forming a parison of a container, comprising:
   a plunger cartridge that includes:
      a plunger extension sub-assembly that has
         a plunger extension carrying cam follower mounts; and
         cam followers carried by the cam follower mounts of the plunger extension; and
      a thimble lock carried radially outwardly of the plunger extension.

14. The apparatus of claim 13, further comprising a plunger pull spring disposed radially outward with respect to the thimble lock and axially between corresponding portions of the thimble lock and the plunger extension.

15. The apparatus of claim 13, wherein the cam followers include at least two pairs of axially spaced apart and diametrically opposed cam followers.

16. The apparatus of claim 13, wherein the plunger cartridge also includes a piston disposed radially outward with respect to the plunger extension and including a wall having a cam path to receive and guide the cam followers.

17. The apparatus of claim 16, wherein the plunger cartridge further includes a piston sleeve carried around a portion of the piston.

18. The apparatus of claim 16, wherein the plunger cartridge also includes a load position spring disposed radially outward with respect to the piston and axially against a portion of the piston.

19. The apparatus of claim 16, further comprising a spring retainer including a pilot portion that is disposed radially inward of a corresponding portion of the piston and that includes a predominantly axially extending channel, and a key carried by the piston and extending into the channel.

20. The apparatus of claim 16, wherein the plunger cartridge also includes:
   a load position spring disposed radially outward with respect to the piston and axially against a portion of the piston; and
   a plunger pull spring disposed radially outward with respect to the thimble lock and axially between corresponding portions of the thimble lock and the plunger extension.

21. A parison plunger actuator for forming a parison of a container, comprising:
   a plunger cylinder assembly that includes:
      a cylinder housing;
      an actuator piston reciprocably carried in the cylinder housing; and
      a piston rod coupled to the piston; and
   a plunger cartridge carried by the plunger cylinder assembly and that includes:
      a plunger extension sub-assembly that has:
         a plunger extension carrying cam follower mounts;

at least two sets of cam followers carried by the cam follower mounts of the plunger extension, wherein the sets of cam followers include cam followers that are axially spaced apart and circumferentially spaced apart;

a plunger extension center support disposed radially inward with respect to the plunger extension and coupled to the piston rod of the plunger cylinder assembly; and a piston disposed radially outward with respect to the plunger extension and including a wall having a cam path to receive and guide the cam followers;

a thimble lock carried radially outwardly of the plunger extension;

a plunger pull spring disposed radially outward with respect to the thimble lock and axially between corresponding portions of the thimble lock and the plunger extension; and a load position spring disposed radially outward with respect to the piston and axially against a portion of the piston.

22. The apparatus of claim 21, wherein the plunger extension sub-assembly of the plunger cartridge further has:

at least one bearing carried around the plunger extension center support, and including upper and lower bearings;

a bearing spacer sleeve carried around the plunger extension center support to axially space the upper and lower bearings; and a bearing plate coupled to a lower end of the plunger extension to retain the lower bearing.

23. The apparatus of claim 21, wherein the plunger extension sub-assembly of the plunger cartridge further has:

a coupler carried at an upper end of the plunger extension and configured to be coupled to a plunger to rotationally fix the plunger to the plunger extension; and a wear washer carried at a lower end of the plunger extension center support to hold the sub-assembly together.

24. The apparatus of claim 21, wherein the plunger cartridge further includes:

a spring retainer including a pilot portion that is disposed radially inward of a corresponding portion of the piston and that includes a predominantly axially extending channel;

a key carried by the piston and extending into the channel.

* * * * *